No. 724,101. PATENTED MAR. 31, 1903.
J. HOFMANN.
MECHANICAL MOVEMENT.
APPLICATION FILED SEPT. 8, 1902.
NO MODEL.
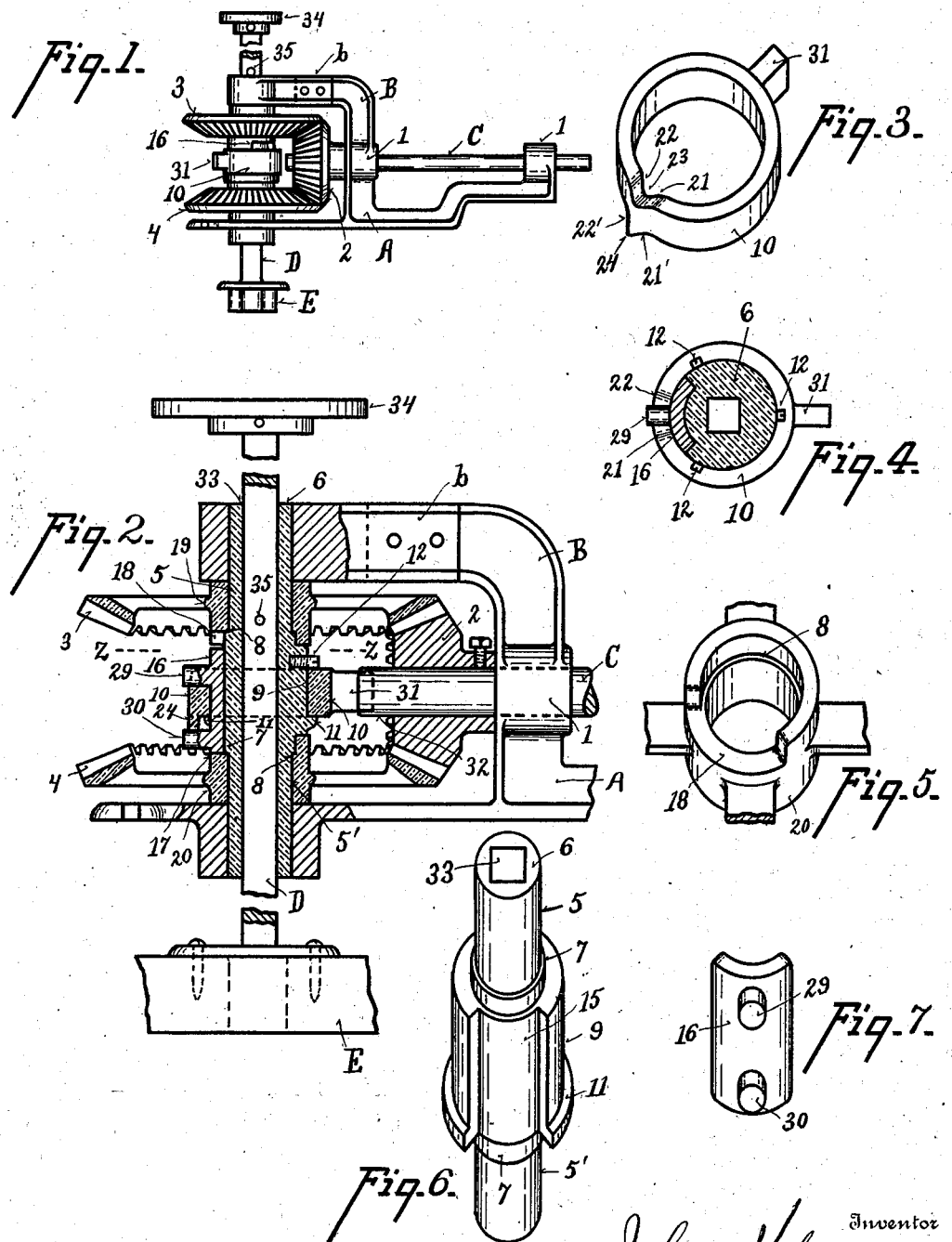

UNITED STATES PATENT OFFICE.

JOHANN HOFMANN, OF WEST COVINGTON, KENTUCKY, ASSIGNOR TO ERNST H. HUENEFELD, OF CINCINNATI, OHIO.

MECHANICAL MOVEMENT.

SPECIFICATION forming part of Letters Patent No. 724,101, dated March 31, 1903.

Application filed September 8, 1902. Serial No. 122,523. (No model.)

*To all whom it may concern:*

Be it known that I, JOHANN HOFMANN, a citizen of the United States, residing at West Covington, in the county of Kenton and State of Kentucky, have invented certain new and useful Improvements in Mechanical Movements, of which the following is a specification.

It is the object of my invention to provide a new and useful mechanical movement of simple and durable construction, whereby continuous rotary motion is transferred into reciprocating rotary motion and whereby a shaft to which the reciprocating rotary motion is imparted is also permitted to be given a reciprocating longitudinal movement, so that a device rigidly secured to the driven shaft is permitted to have a reciprocating movement longitudinally with the shaft and have simultaneously imparted to it a reciprocating rotary movement by improved means; and the invention consists in the parts and in the construction, arrangement, and combinations of parts hereinafter more fully described and claimed.

In the drawings, Figure 1 is a side elevation of my improved device, partly broken away. Fig. 2 is a vertical section of the same, taken on the axial lines of the driving and driven shafts. Fig. 3 is a perspective view of the clutch-key-actuating collar. Fig. 4 is a horizontal cross-section on the line $z\ z$ of Fig. 2, showing the clutch. Fig. 5 is a perspective view of the driven gear-hub and its engaging face for the clutch-key. Fig. 6 is a perspective view of the clutch-sleeve. Fig. 7 is a perspective view of the clutch-key.

A represents a frame having an arm B extending therefrom practically forming a fork, between the tines of which the gearing is disposed. The arm B may be divided, as at $b$, for convenience in assembling the parts.

C is a driving-shaft having bearings 1 in the frame. It carries a bevel-gear 2.

D is a driven shaft.

The bevel-gear 2 meshes with oppositely-disposed driven bevel-gears 3 4, loosely rotatable on journals 5 5' on a sleeve 6. The journals have enlargements 7, against which shoulders 8 of the hub-bores are adapted to take for positioning the gears on the sleeve. The sleeve has a journal 9, about which a collar 10 is adapted to slide. The collar rests on a shoulder 11 on the sleeve and is held against tilting by pins 12. The sleeve has a guideway 15, in which a clutch-key 16 is adapted to be reciprocated into alternate engagement with seats 17 18, shown as arranged on the hubs of the respective gears 3 4. The collar has inclined engaging faces 21 21' 22 22', forming a notch 23 and lug 24 on the collar. The engaging faces are adapted to interengage with lugs 29 30 on the clutch-key, whereby the clutch-key is shifted longitudinally of the driven shaft into engagement with one or the other of the seats of the gears 3 4. During the relative rotation of the key and collar the ends of the collar take snugly between the lugs 29 30, and, as shown in Fig. 2, the distance between the respective inclined faces 21 21' and 22 22' correspond with the distance between the end faces of the collar, so that there may be a snug fit between the end faces of the collar and lugs for preventing rattling and lost motion. The inclined faces are also converging, so that the key may be alternately thrown into engagement with the respective gears, whether the driving-shaft is rotated in one or the other direction. The collar also has a radially-extending lug 31. This latter lug is arranged to strike the inner end 32 of the driving-shaft C or other suitable obstruction for arresting the rotation of the collar, and thereby causing the inclined engaging face on the collar to interengage with the lugs or pins on the key for shifting the key to a different plane longitudinally of the sleeve. The driven shaft is adapted to take through a longitudinal aperture 33 of the sleeve 6. The shaft and aperture are shown square, and the driving-shaft is permitted to have a longitudinal movement in the sleeve, while rotating with it alternately in reverse directions. A suitable actuated device (shown at E) may be secured to the driven shaft for having imparted to it the alternate reverse rotations of the shaft, while permitting it to reciprocate longitudinally with the shaft. Such construction is especially useful in various mechanisms—for instance, in a so-called "washing-machine," in which the actuated device E would correspond with the rubber and the driven shaft D with the rubber-post. The rubber being secured to the lower end of the rubber-post, the rubber will automatically raise and lower with the quantity of wash in the tub and carry the rubber-post with it, so that the post may not extend below the rubber when the latter is raised, and thereby cause tearing of the clothes by having the clothes wrap around the post by reason of the rotations of the rubber.

The driving-shaft may carry a suitable pulley, wheel, or handle for driving it either by hand or power.

In operation the turning of the shaft C continuously in one direction will cause the bevel-gear 2 to rotate continuously in the same direction and the bevel-gears 3 4 to continuously rotate in opposite directions. The gears 3 4 being loosely mounted on the sleeve 6 rotate upon the sleeve; but when the key 16, which slides in the way on the sleeve, engages the seat of either gear 3 or 4 that gear will be rotatively connected with the sleeve and shaft. This engagement is caused by the collar 10, which is disposed loosely between the pins or lugs 29 30, the inclined engaging faces of the collar interengaging with the pins when the collar is arrested by having its lug 31 strike the end of the driving-shaft. Each side of the lug acts as a striking-face in reversing motion. The relative number of revolutions between the driving and driven shafts may depend on the relative size of the driving and driven gears. The distance between the striking-faces for causing shifting of the key may determine the quantity of revolution of the driven shaft between the reversals of its motion. The lug 31 may be provided with a rubber or other suitable washer.

In my improved construction the reversal of motion in the driven shaft may be accomplished instantly without jar by simple means of few parts of economical and durable construction. The revolutions of the driving-shaft may be reversed at any point in the revolution without danger of injury to or disarrangement of the mechanism. If desired, the shaft may be rigidly secured to the sleeve or the shaft itself assume the outward form of the sleeve, in which case the longitudinal movement of the driven shaft will be dispensed with. The sleeve or shaft forms a shank about which the oppositely-disposed gears are loosely journaled. In the form shown I have provided the upper end of the driven shaft with a handle 34 and have provided the driven shaft with a hole 35 intermediate of its ends, so that the driven shaft may be raised longitudinally and a pin inserted in the hole for preventing its retraction, so as, for instance, to position the rubber of a washing-machine adjacent to the lid of the machine out of contact with the clothes for convenience in raising or lowering the lid.

Having thus fully described my invention, what I claim as new, and desire to secure by Letters Patent, is—

1. The combination of a pair of gears, a shaft about which the latter are loosely mounted, a shiftable key, a collar between the pair of gears, each of the pair of gears having a seat for the key, the collar and key provided with mutual engaging faces for shifting said key, means for arresting the rotation of the collar for alternately causing operative engagement between the key and the respective gears of the pair of gears, and means for actuating the gears in opposite directions.

2. The combination of a pair of gears, a sleeve about which the latter are loosely journaled, a shiftable key, a shaft slidable longitudinally in the sleeve but rotating therewith, a collar between the pair of gears, each of the pair of gears having a seat for the key, said collar and key having mutual engaging means, one of said engaging means consisting of inclined engaging faces and arranged for causing shifting of said key, means for arresting the rotation of the collar for alternately causing operative engagement between the key and the respective gears of the pair of gears, and means for actuating the gears in opposite directions.

3. The combination of a pair of gears, a sleeve about which the latter are loosely journaled, means for actuating the gears in opposite directions, a shiftable key, a shaft slidable longitudinally in the sleeve but rotating therewith, a collar between the pair of gears, each of the pair of gears having a seat for the key, the collar and key having inclined engaging faces and contacting means for the latter faces, means for arresting the rotation of the collar thereby causing engagement between said faces and contacting means for alternately engaging the key with the respective gears of the pair of gears, and an actuated device rigidly secured to the end of the shaft.

4. The combination of a loosely-mounted pair of gears having a common axis, each of the gears having a key-seat, means for actuating the gears in opposite directions, a key between the gears adapted to engage with the seats, a collar taking thereabout between the gears, the collar and key having inclined faces and engaging means for the latter faces, means for arresting the rotation of the collar and thereby acting with the inclined face and engaging means for alternately shifting the key into the seats on the respective gears.

5. The combination of a rotatable part, loosely-journaled oppositely-disposed gears having axes coincident with the axis of the rotatable part, means for actuating the gears in opposite directions, the rotatable part having a keyway longitudinal thereof, a key between the pair of gears slidable in the keyway, each of the pair of gears having a key-seat, a collar loosely journaled about the rotatable part between the pair of gears, the collar having engaging faces in different planes longitudinal of the rotatable part, the key having engaging means for the latter, and means for arresting the rotation of the collar and thereby shifting the key.

6. The combination with a frame, of a sleeve journaled therein, oppositely-disposed gears loosely journaled thereon, a gear meshing therewith for rotating the same in opposite directions, the sleeve having a keyway longitudinal thereof, a key between the pair of gears slidable in the keyway, each of the pair of gears having a key-seat, a collar loosely journaled about the sleeve between the pair of gears, the collar having engaging faces in different planes longitudinal of the sleeve, the key having engaging means for said faces, and means for arresting the rotation of the collar and thereby shifting the key, with a shaft slidable longitudinally in the sleeve and rotating therewith.

7. The combination with a frame, of a sleeve journaled therein, oppositely-disposed bevel-gears loosely journaled thereon, a gear meshing therewith for rotating the same in opposite directions, the sleeve having a keyway longitudinal thereof, a key slidable therein, each of the pair of gears having a key-seat, a collar loosely journaled about the sleeve between the pair of bevel-gears, the collar having inclined engaging faces and the key having engaging means for the latter faces coacting to cause longitudinal shifting of the key into alternate engagement with the respective seats of the pair of gears, and means for arresting the rotation of the collar, with a shaft slidable longitudinally of the sleeve and rotating therewith, an actuated device rigidly secured to its end, the shaft having an aperture intermediate of its ends for positioning the actuated device with relation to the gears.

8. The combination of a pair of gears having coincident axes, means for actuating the gears in opposite directions, a shiftable key, each gear having a seat for the key, a collar between the gears having converging inclined faces, the key having engaging faces for the latter faces, a stop for arresting the collar and thereby causing the key to be alternately engaged with the respective seats of the pair of gears.

9. The combination of a pair of gears, a shaft about which the latter are loosely mounted, a shiftable key, a collar between the pair of gears, each of the pair of gears having a seat for the key, said collar and key having mutual engaging means, one of said engaging means consisting of inclined engaging faces and arranged for causing shifting of said key, means for arresting the rotation of the collar for alternately causing operative engagement between the key and the respective gears of the pair of gears, and means for actuating the gears in opposite directions.

In witness whereof I have signed my name hereto in the presence of two subscribing witnesses.

JOHANN HOFMANN.

Witnesses:
AUGUST F. HERBSLEB,
RAYMOND MOELLER.